(12) United States Patent
Wolford

(10) Patent No.: US 6,942,064 B2
(45) Date of Patent: Sep. 13, 2005

(54) TREE STAND WITH ADJUSTABLE LEVELING MECHANISMS

(76) Inventor: Derrell Wolford, 317 Samantha Dr., Sterling, VA (US) 20164

( * ) Notice: Subject to any disclaimer, the term of this patent is extended or adjusted under 35 U.S.C. 154(b) by 0 days.

(21) Appl. No.: 10/156,013

(22) Filed: May 29, 2002

(65) Prior Publication Data

US 2003/0221909 A1 Dec. 4, 2003

(51) Int. Cl.[7] ............................................. A01M 31/00
(52) U.S. Cl. ....................................................... 182/136
(58) Field of Search ................................ 182/135, 136, 182/187, 188, 9, 133

(56) References Cited

U.S. PATENT DOCUMENTS

| | | | |
|---|---|---|---|
| 3,797,273 A | * 3/1974 | Benoit et al. ............... | 464/177 |
| 4,331,216 A | 5/1982 | Amacker | |
| 4,969,538 A | 11/1990 | Amacker | |
| 5,016,733 A | * 5/1991 | Bradley ...................... | 182/187 |
| 5,090,504 A | 2/1992 | Amacker | |
| 5,090,505 A | 2/1992 | Amacker | |
| 5,103,935 A | 4/1992 | Amacker | |
| 5,297,656 A | 3/1994 | Amacker | |
| 5,379,861 A | 1/1995 | Amacker | |
| 5,996,738 A | * 12/1999 | Nelsen ....................... | 182/135 |
| 6,336,520 B1 | 1/2002 | Amacker | |

FOREIGN PATENT DOCUMENTS

FR    2686023 A1 * 7/1993 .......... A01G/23/00

* cited by examiner

*Primary Examiner*—Alvin Chin-Shue
(74) *Attorney, Agent, or Firm*—Richard C. Litman

(57) ABSTRACT

A tree stand is provided having a main tubular structure for supporting the user, a contact blade assembly including a contact blade slidably coupled to said main structure, a gripping blade assembly including a gripping blade slidably coupled to the main tubular structure. The gripping blade assembly and the contact blade assembly are arranged to clamp the tree between the gripping blade and the contact blade, for engaging and abutting the tree stand against the surface of the tree. Furthermore, an adjusting device is coupled to the contact blade assembly and arranged to adjust the angular inclination of the main tubular structure.

16 Claims, 10 Drawing Sheets

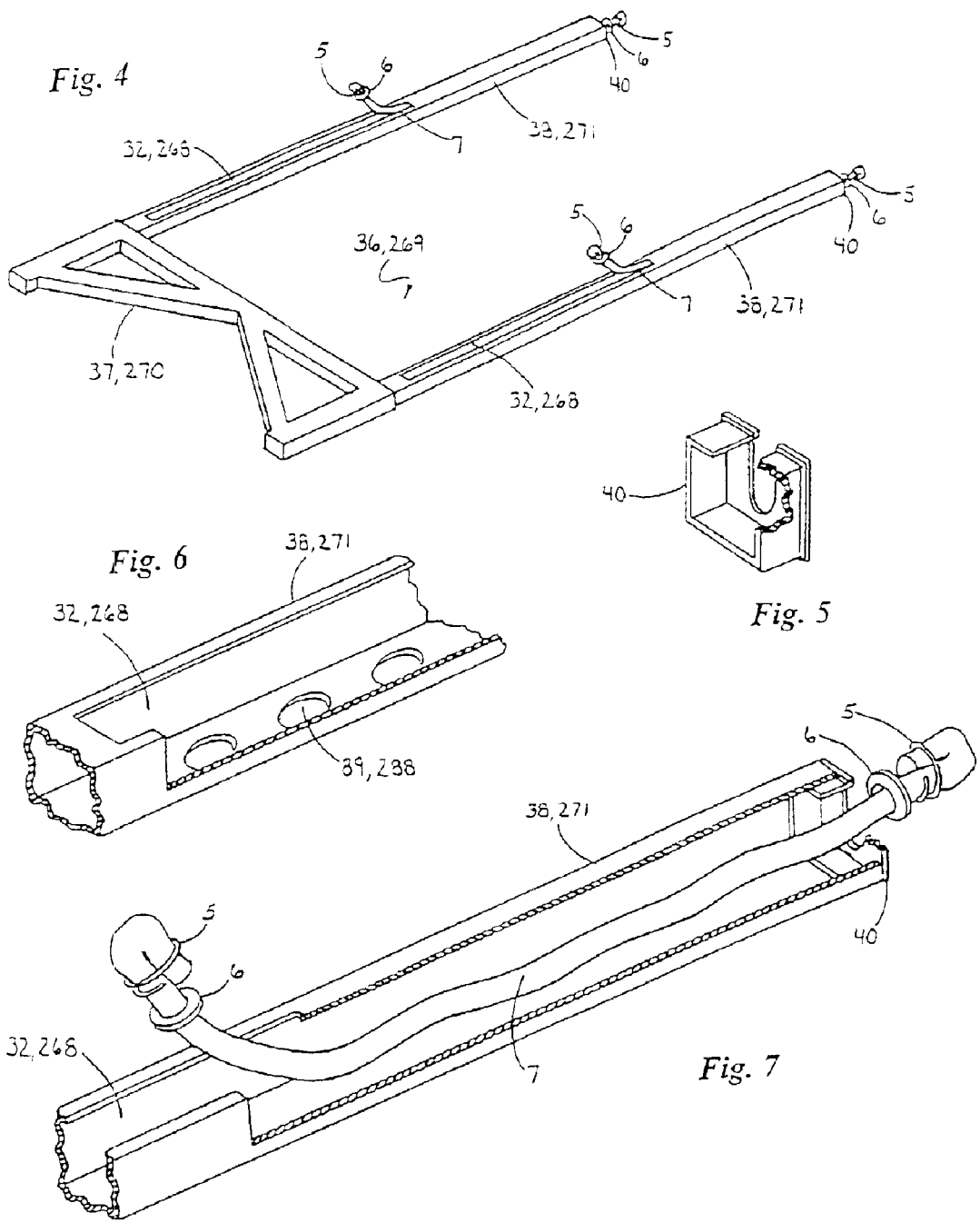

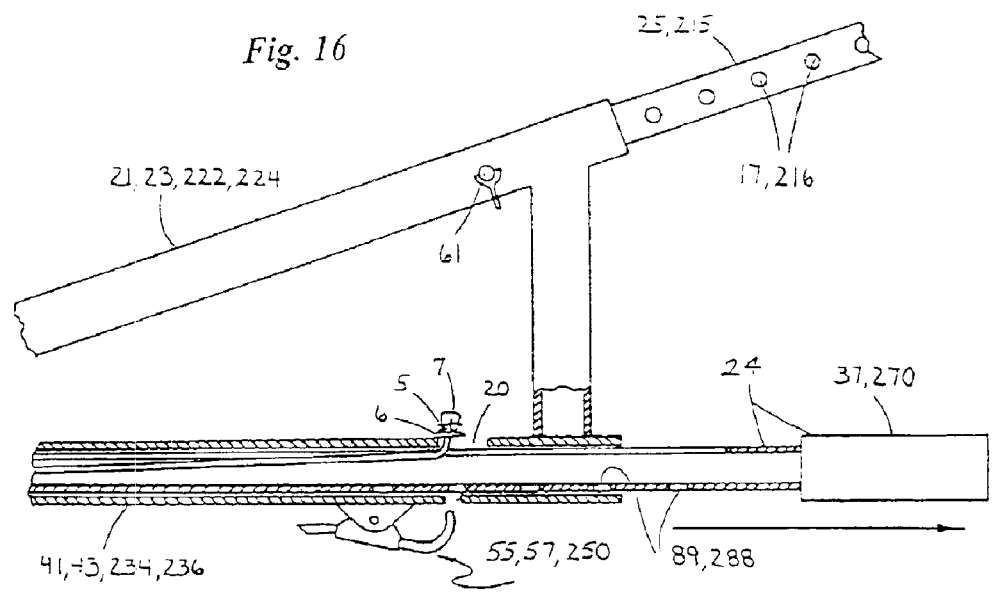
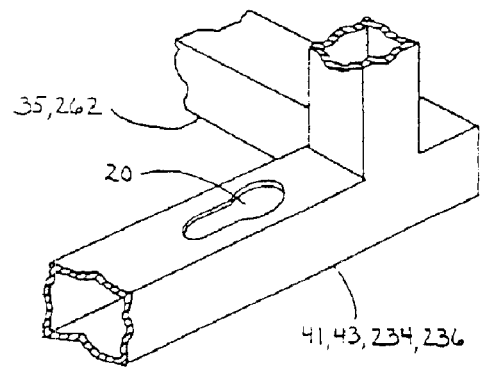
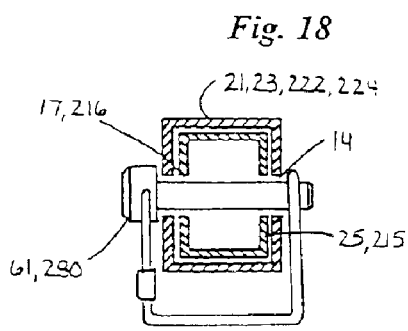

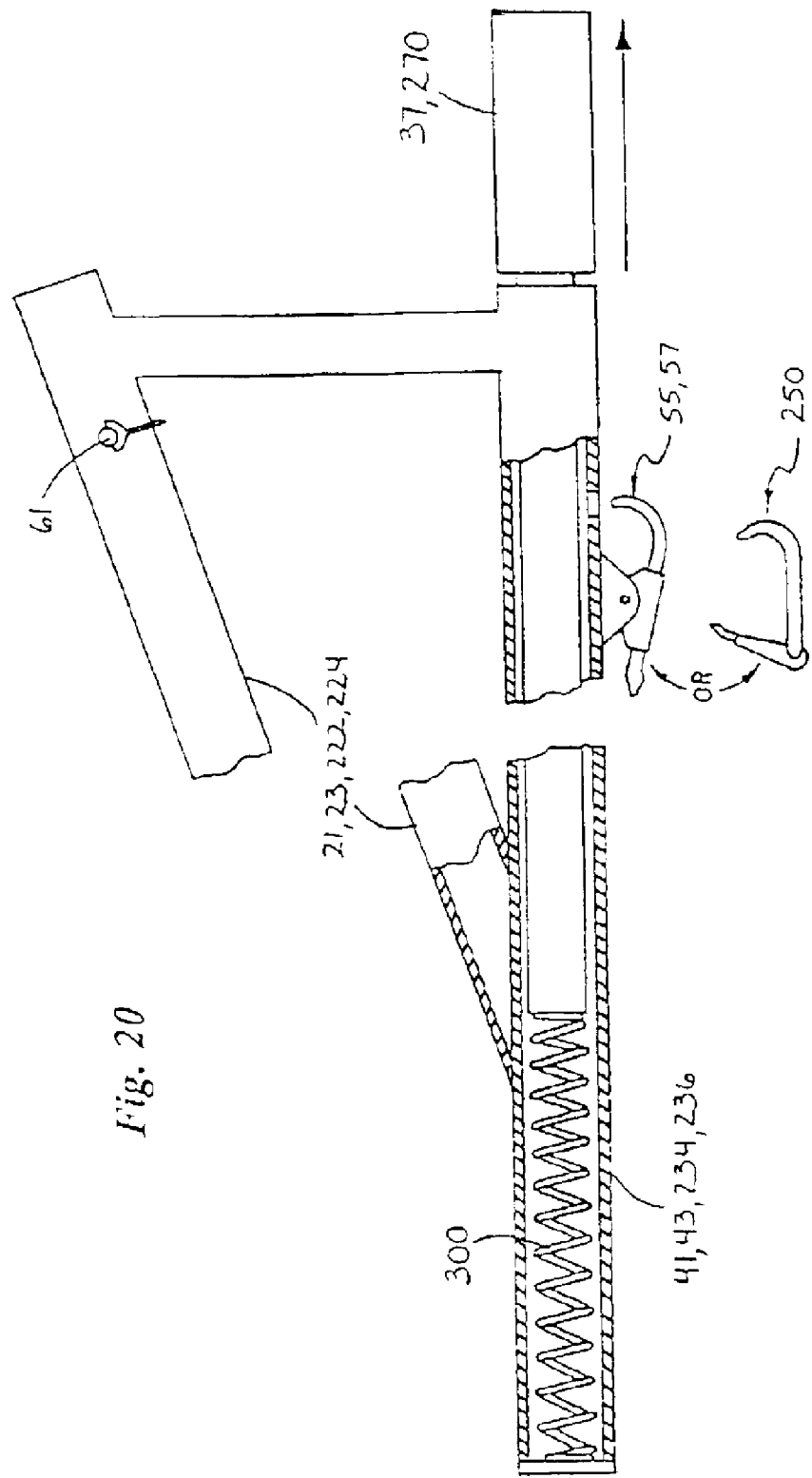

TREE STAND WITH ADJUSTABLE LEVELING MECHANISMS

BACKGROUND OF THE INVENTION

1. Field of the Invention

The present invention relates to a climbing device which is used to climb trees, poles, columns, or the like. In particular, the present invention relates to climbing devices having two main platforms which are alternately raised by the user to obtain a desired elevation on a tree or pole. Furthermore, the present invention relates to climbing devices which have adjustable leveling mechanisms to adjust the angular inclination of the platforms, so that the platforms remain at a horizontal inclination while the user ascends or descends the tree, pole, column, or the like.

2. Discussion of Background Information

A two platform type adjustable tree climbing stand is disclosed in U.S. Pat. No. 5,379,861 to Amacker. A first climbing member has a first upright member gripping structure and movable platform spaced from the upright member to accommodate the body of the user in a sitting position. A second climbing member has a second upright gripping structure and a platform adjacent to the upright member to accommodate the feet of the user. One or both of the climbing members have a retraction device and locking mechanism for adjustably maintaining the climbing members in substantially horizontal position relative to the ground when the climber ascends or descends the tree.

In the case of the above-noted tree stand, the retraction device and locking mechanism include two male sleeves with respective telescoping female sleeves. An outer jaw is connected to the exposed distal ends of the male sleeve. The jaw is positioned on the outside of the tree and then the male sleeves are slid into the female sleeves to connect the platform to the tree. Pins are used to fix the male and female telescoping sleeves together. Resilient biasing members, such as an elastic cord, keep the outer jaw biased against the tree.

The angle of the platforms can be adjusted by pulling on lines attached to pins securing the male and female sleeves together. As a result, the resilient biasing means reduces the length of the telescoping arms and pulls the outer jaw towards the platform with the tree being subjected to a clamping or clasping effect between the outer jaw and the platform.

However, this two platform type tree stand has some disadvantages with its functionality. The resilient member (i.e. an elastic cord) is permanently attached at the bottom of the female sleeve and is manually attached to the most outer end of the male sleeve near the outer jaw. Before the user engages the tree stand to the tree, the user must remove the elastic cord from the telescoping male sleeves, proceed with the installation process of the outer jaw around the tree, reinstall the male sleeves into the female sleeves, and then remember to re-install the elastic cord to the most outer end of the male sleeves near the outer jaw.

In this case, the elastic cord is the only item that holds the platform and the outer jaw together when the security pins are removed for a leveling adjustment. If the user has forgotten to attach the elastic cord, or the elastic cord has broken without knowledge to the user, when extracted, the security pins will allow the outer jaw and telescoping male sleeves to withdraw from the female sleeves affiliated with the platform. As a result, the clasping effect between the outer jaw and the platform is lost, and the platform can become disengaged from the tree unexpectedly. When this occurs, the user of the tree stand can sustain serious injuries from falling out of the stand down to ground level.

Another disadvantage with the two platform type tree stand and the aforementioned retraction cord and locking mechanism is that, even if the user has remembered to attach the cord, the design allows the possibility of the user to inadvertently remove the pins. If that scenario occurs, the weight of the stand and the user's body can easily break the elastic cord. For example, if by error the user decides to extract the security pins to make a leveling adjustment to the first climbing member, and then sits before the security pins have been re-installed, or the user decides to extract the security pins from the second climbing member and stands before the security pins are re-installed, the elastic cord would not have enough strength to support the weight of the user. This would allow the first climber device or second climber device to separate itself from the outer jaw and male sleeves, leaving the climbing member in an unsecured state and the user in a hazardous situation. The same elastic cord failure scenario would apply in the case of a security pin failure. For instance, the security pin can break or may not be re-installed properly into a leveling hole.

There exists a need for a safer and more user friendly tree stand that has adjustable leveling mechanisms that overcome the aforementioned disadvantages.

SUMMARY OF THE INVENTION

The present invention provides a safer and more user friendly tree stand having adjustable leveling mechanisms that overcome the aforementioned disadvantages.

The present invention utilizes permanently attached pivoting triggers, an adjustable contact blade, and an elastic cord that is secured during the entire ascent and descent from the tree or pole.

In accordance with the features of this invention, the probability that the user will be put into a hazardous situation during a leveling procedure, is significantly reduced.

According to an aspect of the present invention, a tree stand is provided. The tree stand includes a main tubular structure for supporting the user, a contact blade assembly including a contact blade slidably coupled to the main structure, a gripping blade assembly having a gripping blade slidably coupled to the main tubular structure, and an adjusting device coupled to the contact blade assembly arranged to adjust an angular inclination of the main tubular structure. The gripping blade assembly and the contact blade assembly are arranged to clamp the tree between the gripping blade and the contact blade, for engaging and abutting the tree stand against the surface of the tree.

According to another aspect of the present invention, the gripping blade assembly is telescopically connected to the main tubular structure via a pair of adjustable gripping blade telescoping arms. Furthermore, another aspect of the invention includes the contact blade being telescopically connected to the main tubular structure via a pair of adjustable contact blade telescoping arms. In yet another aspect of the present invention, the main tubular structure includes a pair of contact blade telescoping arm receiving tubes for telescopically accepting the contact blade telescoping arms. Additionally, other aspects of the present invention include the contact blade assembly further including cord receiving slots on an upper surface of the contact blade telescoping arms.

In another aspect of the present invention, the contact blade assembly further includes elastic cords within the contact blade telescoping arms, one end of each of the elastic cords secured to distal ends of the contact blade telescoping arms, the distal ends being directly inserted into the contact blade telescoping arm receiving tubes, and an opposing end of the elastic cords being routed upward through the cord receiving slots and attached to an upper surface of the contact blade telescoping arm receiving tubes via a key hole.

Other aspects of the present invention include the contact blade assembly further including leveling adjustment holes on a bottom surface of the contact blade telescoping arms structured for releasably coupling with the adjusting device. According to another aspect of the present invention, an adjusting device including at least one latching mechanism to releasably engage the leveling adjustment holes for securing the contact blade telescoping arms from movement within the contact blade telescoping arm receiving tubes. In another aspect of the present invention, the pair of adjustable contact blade telescoping arms are rigidly interconnected by the contact blade.

Further aspects of the invention include the contact blade conforming to a shape being one of obtuse angled, u-shaped, channel-shaped, three-sided, five-sided, and semi-circular-shaped. According to other aspects of the present invention, include at least one latching mechanism including a latching hook structured to be removably insertable into the leveling adjustment holes.

According to another aspect of the present invention, a tree stand is provided which includes two separate platforms. Each platform includes a main tubular structure for supporting the user. The platform further includes a gripping blade assembly for clamping the tree between a gripping blade and a contact blade with, the gripping blade assembly being telescopically connected to the main tubular structure via a pair of adjustable gripping blade telescoping arms. The platform also includes a contact blade assembly for engaging and abutting against an inside surface of the tree, and for adjusting an angular inclination of the main tubular structure, with the contact blade being telescopically connected to the main tubular structure via a pair of adjustable contact blade telescoping arms.

According to still a further aspect of the present invention, the contact blade assembly further includes leveling adjustment holes on a bottom surface of the contact blade telescoping arms for receiving a latching hook. Further aspects of the invention include each platform further including at least one latching mechanism which engages the leveling adjustment holes for securing the contact blade telescoping arms from movement within the contact blade telescoping arm receiving tubes.

In yet another aspect of the invention a two platform tree climbing stand is provided. The two platform stand includes a seat climber having an inboard and outboard side, the inboard side being structured and arranged to engage the tree. The seat climber includes a first main tubular structure for supporting the user, a first gripping blade assembly telescopically connected to an upper portion of the inboard side of the first main tubular structure, and a first contact blade assembly telescopically connected to a lower portion of the inboard side of the first main tubular structure. The two platform tree climbing stand also includes a foot climber having an inboard and outboard side, the inboard side being structured and arranged to engage the tree, the foot climber including a second main tubular structure for supporting the user, a second gripping blade assembly telescopically connected to an upper portion of the inboard side of the second main tubular structure, and a second contact blade assembly telescopically connected to a lower portion of the inboard side of the second main tubular structure.

Other aspects of the present invention include the first and second contact blade assemblies having a contact blade rigidly connecting a pair of contact blade telescoping arms oriented in a parallel configuration. Further aspects of the present invention include the first and second main tubular structures including a pair of receiving tubes for receiving the pair of contact blade telescoping arms. According to other aspects of the present invention, the first and second contact blade assemblies contain a biasing system for forcing the contact blade against the surface of the tree.

According to another aspect of the present invention, the biasing system includes resilient cords secured to distal ends of the contact blade telescoping arms, the cords being internally routed within the contact blade telescoping arms and routed externally through cord receiving slots located on upper side of the contact blade telescoping arms, a free end of the cords being secured to each respective receiving tube via a keyhole slot.

According to another aspect of the present invention, the biasing system includes a spring retained within the receiving tubes and positioned between distal ends of the contact blade telescoping arms, the distal ends being directly inserted into the receiving tubes such that the contact blade telescoping arms are forced out of the receiving tubes when the spring is under compression.

According to still further aspects of the present invention, the tree climbing stand further includes latching assemblies having hook-shaped latches secured to the contact blade receiving tubes for securing the first and second pair of adjustable contact blade telescoping arms in position, the telescoping arms having a series of pairs of receiving holes and the receiving tubes having a latch receiving hole for securely receiving distal ends of the hook-shaped latches.

Additionally, other aspects of the present invention include an apparatus for ascending or descending one of a tree, pole, and column, and for providing an elevated platform adjacently attached to the one of a tree, pole, and column. The apparatus includes a seat climbing platform having a first main tubular structure for supporting the user, a first gripping blade assembly for clamping the one of a tree, pole, and column between a first gripping blade and a first contact blade, the first gripping blade assembly telescopically connected to the first main tubular structure via a first pair of adjustable gripping blade telescoping arms. Furthermore, the apparatus includes a first contact blade assembly for engaging and abutting against an inside surface of the tree, pole, and column, and for adjusting the angular inclination of the first main tubular structure, the first contact blade telescopically connected to the first main tubular structure via a first pair of adjustable contact blade telescoping arms.

The apparatus also includes a foot climbing platform, a second main structural tubular structure for supporting the user, a second gripping blade assembly for clamping the one of a tree, pole, and column between a second gripping blade and a second contact blade, the second gripping blade assembly telescopically connected to the second main tubular structure via a second pair of adjustable gripping blade telescoping arms, and a second contact blade assembly for engaging and abutting against an inside surface of the tree, pole, and column, and for adjusting the angular inclination of the second main tubular structure, the second contact blade telescopically connected to the second main tubular structure via a second pair of adjustable contact blade telescoping arms.

According to still a further aspect of the present invention, the first and second main tubular structure including left side and right side contact blade telescoping arm receiving tubes for telescopically receiving said first and second pair of adjustable contact blade telescoping arms. Further aspects of the invention include the first and second contact blade assemblies having a retraction system including a resilient member located within the first and second pair of contact blade telescoping arms.

According to still a further aspect of the present invention, the retraction system includes elastic cords secured to distal ends of the contact blade telescoping arms, the distal ends being portions of the first and second contact blade assemblies which are inserted into the left side and right side contact blade receiving tubes, the opposing end of the elastic cords being drawn upwardly through cord receiving slots located on the upper sides of the contact blade telescoping arms and secured to each respective receiving tube.

According to other aspects of the present invention, the retraction system has a spring inserted into the left side and right side contact blade telescoping arm receiving tubes, the spring being biased against the first and second pair of adjustable contact blade telescoping arms.

Other aspects of the present invention include latching assemblies having hook-shaped latches secured to the left side and right side contact blade telescoping arm receiving tubes for securing the first and second pair of adjustable contact blade telescoping arms in position, the telescoping arms having a series of pairs of receiving holes and the receiving tubes having a latch receiving hole for securely receiving distal ends of the hook-shaped latches.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 depicts an isometric view of a contact blade assembly;

FIG. 5 depicts an isometric view of an elastic cord retaining cap;

FIG. 6 depicts an isometric view of a contact blade assembly telescoping arm, the illustration having a cut-out section revealing contact blade leveling holes;

FIG. 7 depicts an isometric view of a contact blade assembly telescoping arm, the illustration having a cut-out revealing the attachment and routing of the elastic cord upwards through a cord receiving slot;

FIG. 16 is an illustration of a partial side view cross-sectional perspective of the contact blade telescoping arms installed within the contact blade receiving tubes;

FIG. 17 depicts an isometric top view of a keyhole in which the elastic cord is attached;

FIG. 18 is a cross-sectional view depicting a security pin which secures the gripping blade to the gripping blade receiving tubes;

FIG. 20 depicts a partial side cross-sectional view of an alternative spring device installed inside the contact blade receiving tube, in place of the elastic cord.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
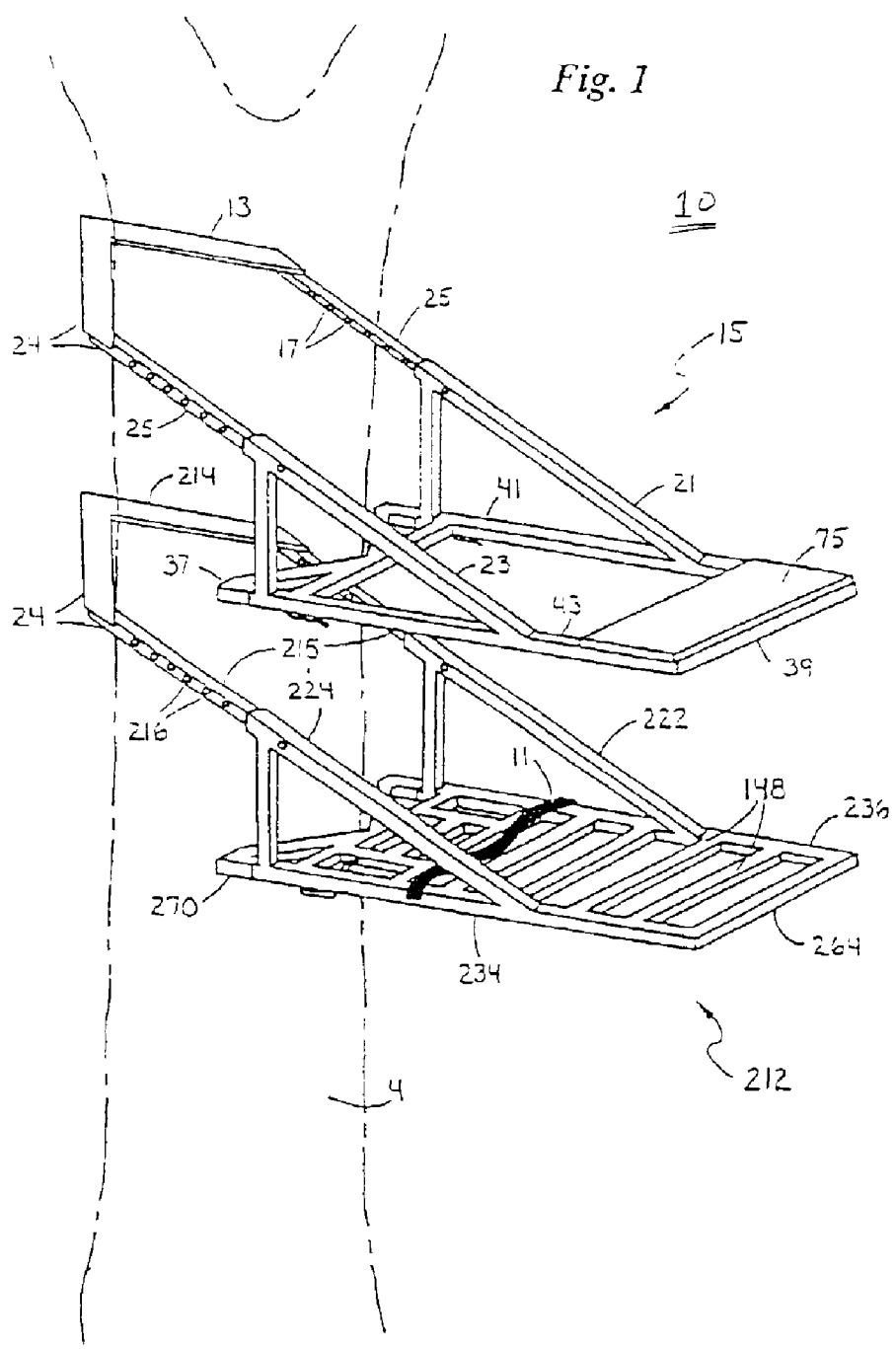
FIG. 1 is an illustration of the tree stand mounted to the trunk of a tree.

FIG. 1 illustrates a first embodiment of the present invention attached to a tree, pole, column or the like. The tree stand 10 includes two primary platforms, seat climber 15 and foot climber 212. Both seat climber 15 and foot climber 212 include three main subcomponents: main tubular structure 16, 213 (see FIG. 2 and FIG. 3), gripping blade assembly 24, and contact blade assembly 36, 269 (see FIG. 4). For both the seat climber 15 and foot climber 212, the gripping blade assembly 24 and contact blade assembly 36, 269 are essentially the same components.

Figure 2:
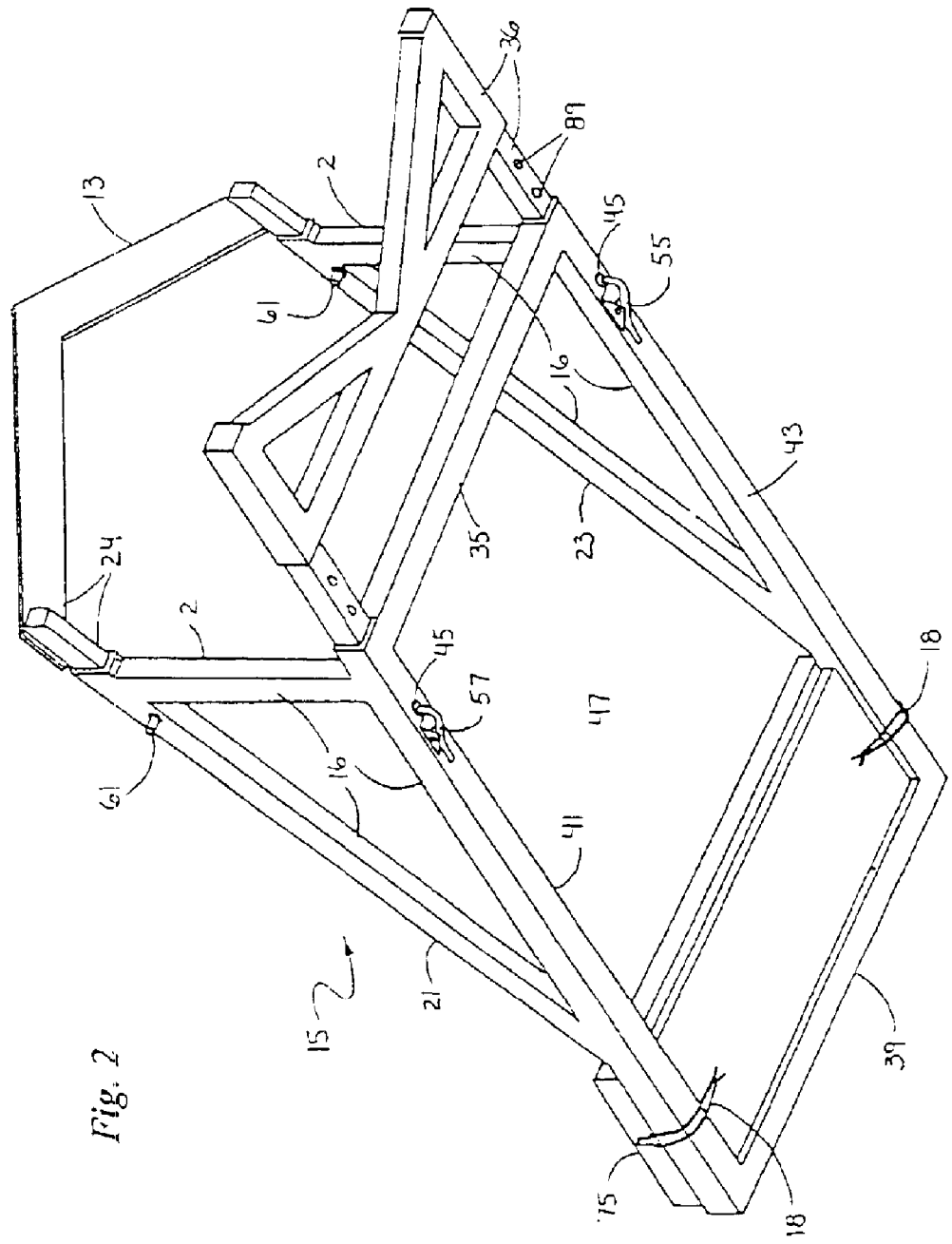
FIG. 2 depicts an isometric view of the underneath side of a seat climber.

FIG. 1, FIG. 2, and FIG. 16 depict gripping blade assembly 24 which is telescopically attached to seat climber 15. Another gripping blade assembly 24 is telescopically attached to foot climber 212. As previously mentioned, both gripping assemblies 24 are essentially identical. The function of each gripping blade assembly 24 is to allow tree 4 to be clasped or clamped between the gripping blade assembly 24 and each respective climber 15, 212. Each gripping blade assembly 24 includes a pair of gripping blade telescoping arms 25, 215 configured in a parallel orientation and having a series of pin receiving holes 17, 216 along the length of and bored through both walls of the tube which makes up the telescoping arms 25, 215, as shown in FIG. 1 and FIG. 16. The gripping blade telescoping arms 25, 215 are inserted into gripping blade receiving tubes 21, 23, 222, 224, and may be adjusted according to the diameter of the tree or pole 4 being climbed and angle of inclination in which the platform addresses the tree or pole 4.

FIG. 2 depicts an isometric view of the underneath side of seat climber 15. A main tubular structure 16 of seat climber 15 includes a rectangular shaped base having an outer frame cross member 39, inner frame cross member 35, right side contact blade receiving tube 41, and left side contact blade telescoping arm receiving tube 43. Elevation supports 2 are attached to and project perpendicularly upward from the right and left side receiving tubes 41, 43 near the inner frame cross member 35. Left side 23 and right side 21 gripping blade receiving tubes are connected to the upper ends of elevation supports 2 and to the respective left side receiving tube 43 and right side receiving tube 41 to form a triangular shaped frame structure projecting upright and normal to main tubular structure 16. Seat member 75 is securely and removably fastened to the upper side of main tubular structure 16 near outer cross member 39, e.g., with mounting tethers 18.

Hand trigger assemblies 55, 57 are attached to the bottom of left side seat climber contact blade receiving member 43 and right side seat climber contact blade receiving member 41. The parts that make up trigger assemblies 55, 57, and the manner in which the user operates hand triggers 55, 57 to telescopically adjust the distance that contact blade telescoping arms 38, 271 are extended or retracted will be discussed in a later section of the specification. Security pins 61 and respective receiving holes 14 (see FIG. 18) are installed on the sides of gripping blade receiving tubes 21, 23 to retain gripping blade telescoping arms 25. The function of security pins 61 will also be further elaborated later on in the specification.

Figure 3:
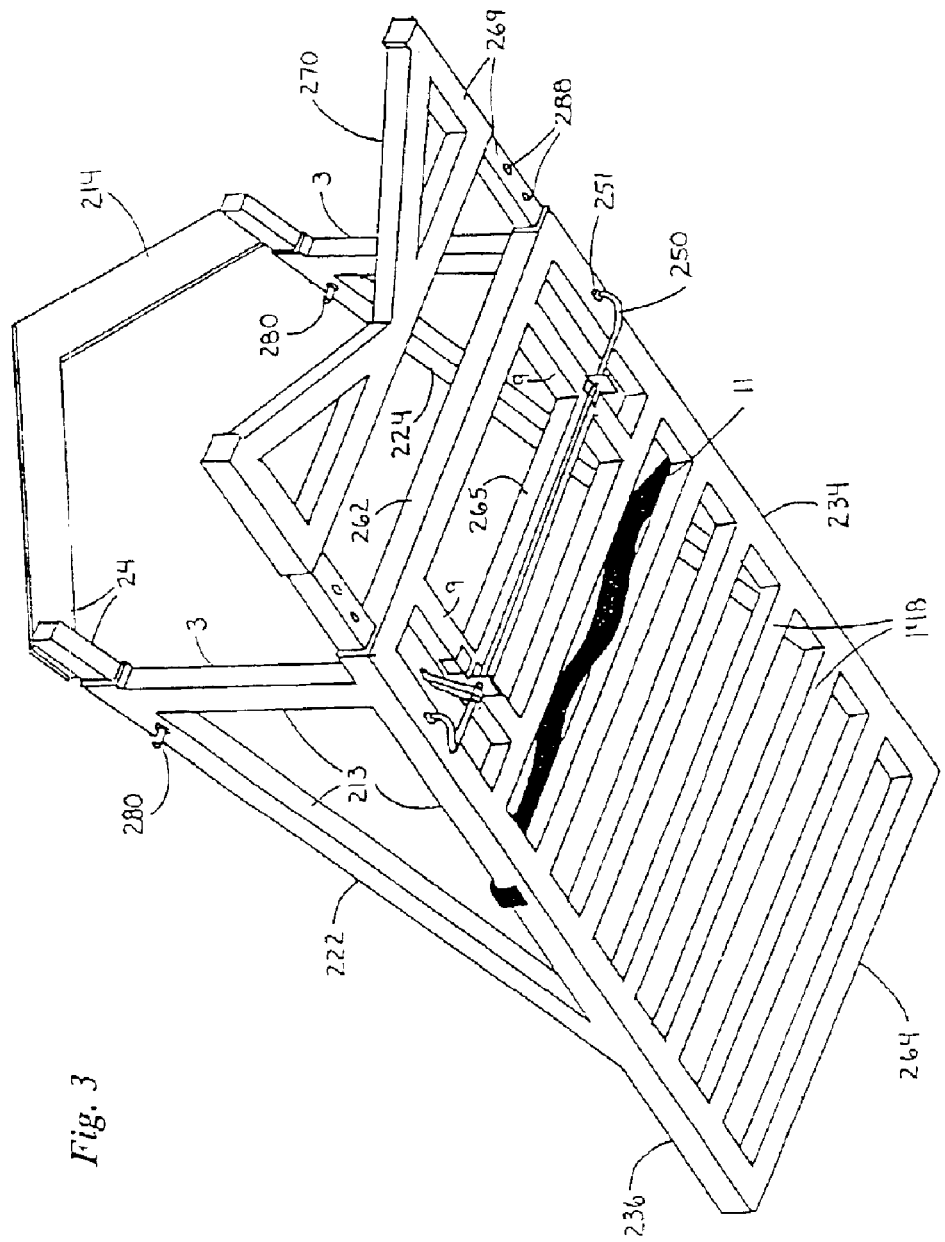
FIG. 3 depicts an isometric view of the underneath side of a foot climber.

FIG. 3 presents an isometric view of the underneath side of foot climber 212. Even though foot climber 212 is similar to seat climber 15 in basic size and shape, there are numerous differences between both platform which are now discussed below. The main tubular structure 213 of foot climber 15 includes a rectangular shaped base having an outer frame cross member 264, inner frame cross member 262, left side contact blade telescoping arm receiving tube 234, and right side contact blade telescoping arm receiving tube 236. Elevation supports 3 are attached to and project perpendicularly upwards from left side receiving tube 234 and right side receiving tube 236 near the inner frame cross member 262. Left side 224 and right side 222 foot climber gripping blade receiving tubes are connected to upper ends of elevation supports 3 and to the respective left side receiving tube 234 and right side receiving tube 236 to form a triangular frame structure projecting upright and normal to the main tubular structure 213 of foot climber 212. Within the rectangular shaped base of the foot climber 212, a series of footing grates 148 are installed in a parallel configuration to frame cross members 262, 264. The grates 148 support the user for climbing or standing position. Two foot trigger assembly support rails 9 are interconnected between inner frame cross member 262 and the most inwardly positioned foot grate 148. An interconnecting member 265 is connected between both support rails 9. Foot strap 11 is attached to left side receiving tube 234 and right side receiving tube 236 and is draped over the top surface of the rectangular shaped base.

As shown in FIG. 3, foot trigger assembly 250 is attached to the bottom of support rails 9. The design and function of the foot trigger assembly 250, and the manner in which the user operates foot trigger 250 to telescopically adjust the distance that contact blade assembly 269 is extended or retracted will be discussed in further detail in a later section of the specification. Security pins 280 and respective receiving holes 14 (see FIG. 18) are installed on the sides of gripping blade receiving tubes 222, 224 to retain gripping blade telescoping arms 215. The function of security pins 280 will also be further elaborated later on in the specification.

Figures 19A, 19B, 19C:
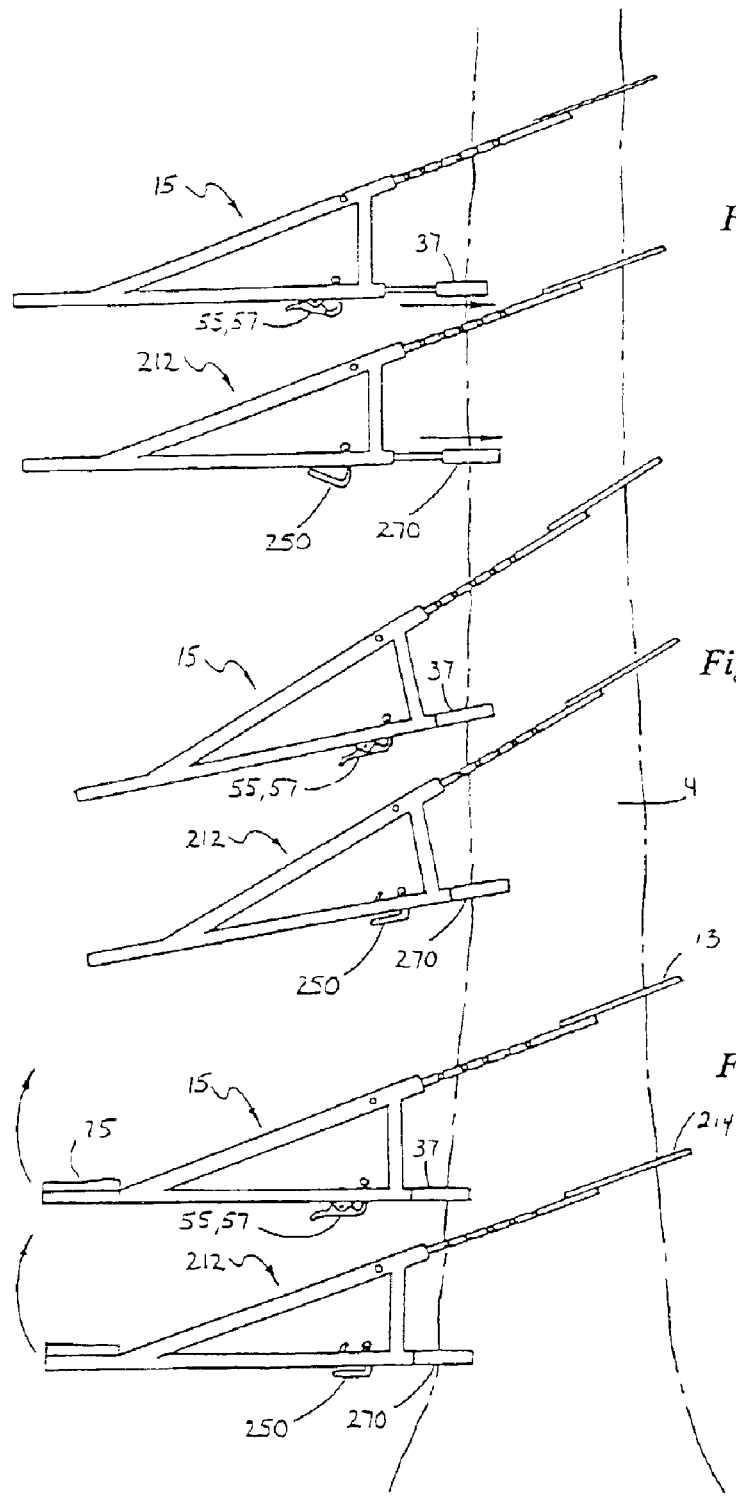
FIG. 19(a) illustrates the tree stand initially mounted to a tree trunk near ground level.
FIG. 19(b) illustrates an "out of level" result that occurs to the main tubular structure of the climbing platforms when ascending or descending a tree trunk.
FIG. 19(c) illustrates the main tubular structure of the tree stand after the tree stand has been leveled.
Figure 21A:
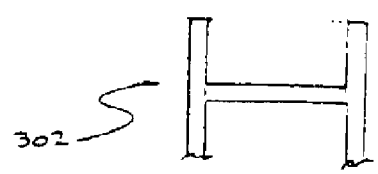
FIGS. 21 (a)–(d) illustrate a variety of alternative embodiments for the shape of the contact blades.
Figure 21B:
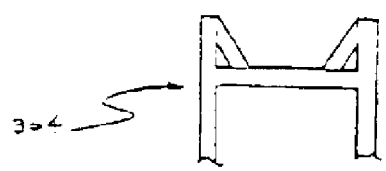
Figure 21C:
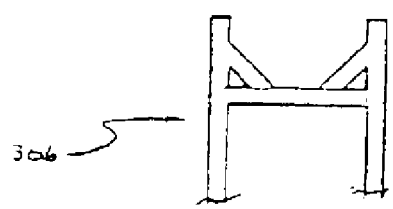
Figure 21D:
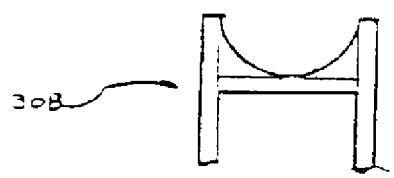

FIG. 4 is an isometric perspective of contact blade assemblies 36, 269 which are part of the tree stand leveling mechanisms. Contact blade assemblies 36, 269 are substantially similar in design and function, and therefore, have similar components which are designated by the same numerals. Contact blade assembly 36, 269 includes two male telescoping arms 38, 271 which are designed to be inserted into contact blade telescoping arm receiving tubes 41, 43, 234, 236 (from FIG. 2 and FIG. 3). Contact blade 37, 270 rigidly interconnects telescoping arms 38, 271 so the arms 38, 271 are configured in a parallel orientation with respect to each other. The shape of contact blade 37, 270 is configured in an obtuse angle with respect to the embodiment described in FIG. 4, however, the shape of contact blade 37, 270 may conform to various shapes such as semicircular, channel shaped or u-shaped, 3-sided, 4-sided, 5-sided, etc. When the tree stand 10 is in use, contact blades 37, 270 engage the surface the tree 4 being climbed as illustrated in FIGS. 19(a)–19(c), which will be discussed later on in the specification.

FIG. 5 through FIG. 7 illustrate various features on the contact blade assembly 36, 269 herein described below. FIG. 6 illustrates a series of incremental leveling adjustment holes 89, 288 which are located on the underneath side of contact blade telescoping arms 38, 271. Leveling adjustment holes 89, 288 are intended to receive hand trigger latching hooks 31 and foot trigger latching hooks 249. A description of how hand trigger latching hooks 31 and foot trigger latching hooks 249 interact with incremental leveling holes 89, 288, will be provided later in the specification.

FIG. 7 and FIG. 4 illustrate how elastic cord 7 is fed through cord receiving slots 32, 268 located on the upper side of contact blade assembly telescoping arms 38, 271. FIG. 5 illustrates a removable retaining cap 40 having a slot which is fitted into the distal tips of contact blade telescoping arms 38, 271. One end of elastic cord 7 is internally inserted through the back end of telescoping arm 38, 271, until retaining cap 40 is inserted into the distal end of the telescoping arms 38, 271, as shown in FIG. 7. The opposite end of elastic cord 7 is routed through cord receiving slot 32, 268. Both ends of elastic cord 7 are terminated with washer 6 and crimp wire 5.

Figure 8:
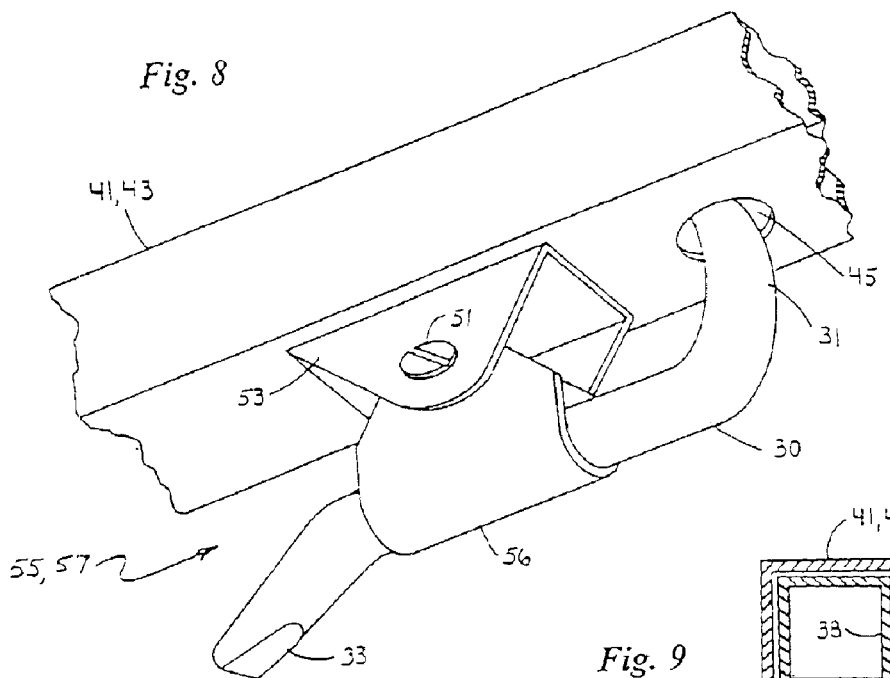
FIG. 8 depicts an isometric view of a hand trigger assembly mounted on the underneath side of the seat climber.
Figure 9:
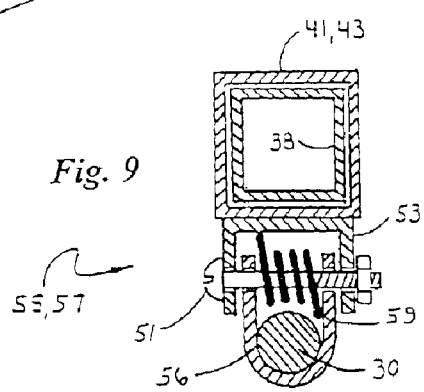
FIG. 9 depicts a front cross-sectional view of the hand trigger and associated mounting hardware.
Figure 10:
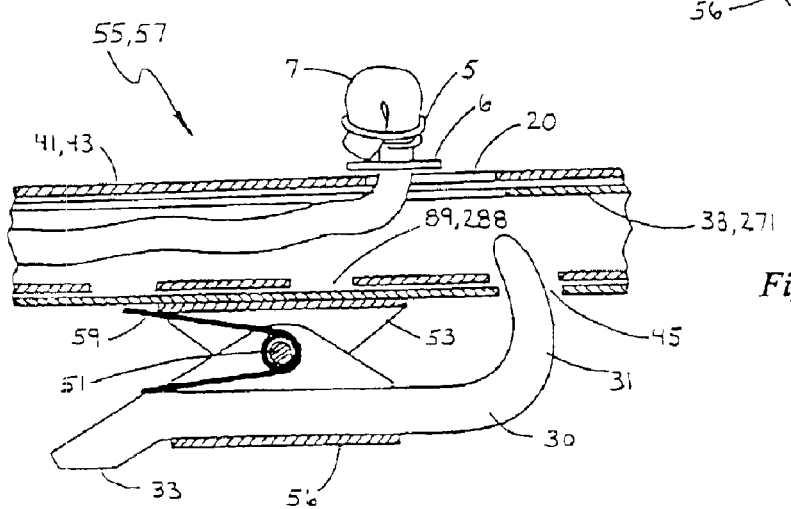
FIG. 10 depicts a side cross-section view of the hand trigger, associated mounting hardware, and the elastic cord.

FIG. 8 through FIG. 10 illustrate details of hand trigger assemblies 55, 57 which are located on the underneath of seat climber 15 as illustrated in FIG. 2 and FIG. 16. The hand trigger assembly 55, 57 includes a metal rod 30 shaped to form a beveled finger grip 33 at one end while the opposing end is shaped to form a tapered latching hook 31. The metal rod 30 is housed within trigger cradle bracket 56. Attached to the underneath side of both contact blade receiving tubes 41, 43 is hand trigger pivoting bracket 53 which supports hand trigger cradle bracket 56 through the use of a pivoting screw and nut 51.

FIGS. 9 and 10 illustrate the use of tension coil spring 59 in the hand trigger assembly 55, 57 to bias the latching hook 31 into the locked position. FIG. 9 depicts a front cross-sectional view of hand trigger assembly 55, 57. As can be seen, contact blade telescoping arm 38 is telescopically fit inside contact blade receiving tube 41, 43. Metal rod 30 is secured to trigger latch cradle bracket 56, which in turn, is pivotably mounted to screw and nut 51. Pivoting bracket 53 receives screw and nut 51, and furthermore, is secured to the bottom side of receiving tube 41, 43. Retaining tension coil spring 59, which keeps constant upward pressure on the hand trigger latching hook 31, is centered and held by screw 51 and is housed within trigger latch cradle bracket 56 and pivoting bracket 53.

FIG. 10 depicts a side cross-sectional view of hand trigger 55, 57 in an engaged or "latched" state. Rod 30 is biased such that latching hook 31 is forced into latch receiving hole 45 and the appropriate contact blade leveling holes 89, whenever the hand trigger 55, 57 is in a released state by the user. When the user depresses beveled finger grip 33 towards receiving tubes 41, 43, the rod pivots about screw and nut 51, and the latching hook 31 is then withdrawn from latch receiving hole 45 and contact blade leveling adjustment holes 89. At this point, hand trigger 55, 57 is in a disengaged state. When the user releases the beveled finger grip, the biasing force from tension coil spring 59 drives the latching hook 31 back into latch receiving hole 45 and leveling holes 89, leaving hand trigger 55, 57 in a latched and engaged state. Also, the constant spring force allows trigger latching hook 31 to maintain stability while being inserted into one of the several contact blade leveling holes 89.

Figure 11:
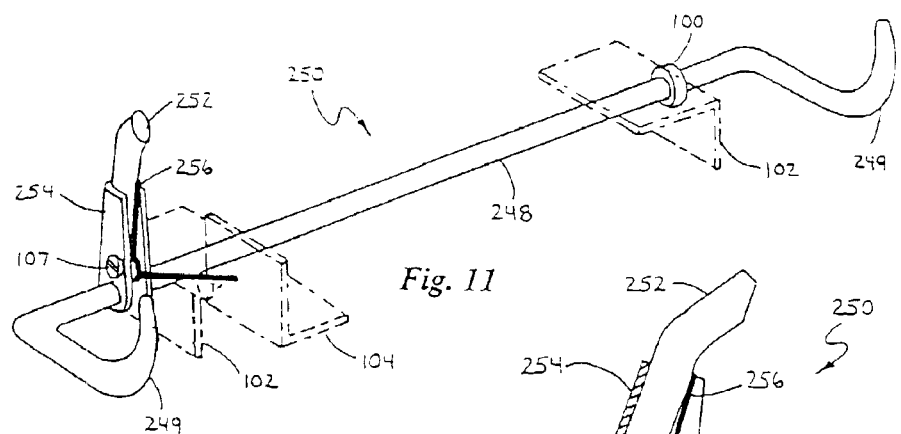
FIG. 11 is an isometric view of the foot trigger assembly.

FIG. 11 shows an isometric view of foot trigger assembly 250 which is mounted on the underneath side of foot climber 212 as shown in FIG. 3. Foot trigger assembly 250 includes a "longhorn" shaped actuation linkage rod 248 having tapered latching hooks 249 at each distal end. Rigidly attached to, and offset from the middle of linkage rod 248, upwardly projects foot lever 252 which is housed within foot lever cradle bracket 254. The foot trigger assembly 250 is attached to the underneath side of foot climber 212 with the use of a pair of actuation linkage bearing bracket assembly 102 and bearing collar 100.

Figure 12:
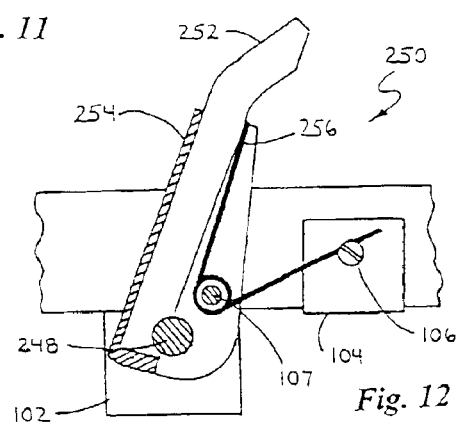
FIG. 12 depicts a side cross-sectional view of the foot trigger and associated mounting hardware.

FIG. 12 shows a side cross-sectional view of foot trigger assembly 250, including foot trigger actuation linkage rod 248, cradle bracket 254, coil tension spring 256, and coil spring tension bracket 104. The coil tension spring 256 is fastened by coil spring retaining screw 107. The arms of coil tension spring 256 are biased against foot lever 252 and coil spring arm holding screw 106. The spring 256 keeps constant upward pressure on foot lever 252. As a result, actuation linkage rod 248 is biased such that both foot trigger latching hooks 249 are forced into latch receiving holes 251 and contact blade leveling holes 288 whenever the foot trigger 250 is in a released state (i.e., no pressure being exerted by a foot or hand). When the user depresses foot lever 252, the actuation linkage rod 248 rotates within bracket bearing assembly 102 and both foot trigger latching hooks 249 are withdrawn from latch receiving holes 251 and leveling holes 288, thus leaving the latching hooks 249 in a disengaged state. When the user releases force from the foot lever 252, the biasing force from coil spring 256 drives both foot trigger latching hooks 249 back into latch receiving holes 251 and contact blade leveling holes 288, leaving the foot trigger 250 assembly in a latched and engaged state. Furthermore, the constant spring force exerted by coil tension spring 256 allows the foot trigger latching hooks 249 to maintain stability while being inserted into one of several contact blade leveling holes 288.

Figure 13:
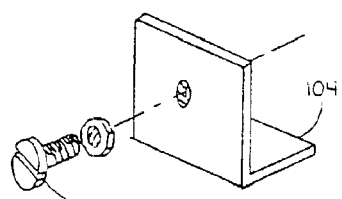
FIG. 13 is an exploded view of a coil spring tension bracket with associated fasteners.
Figure 14:
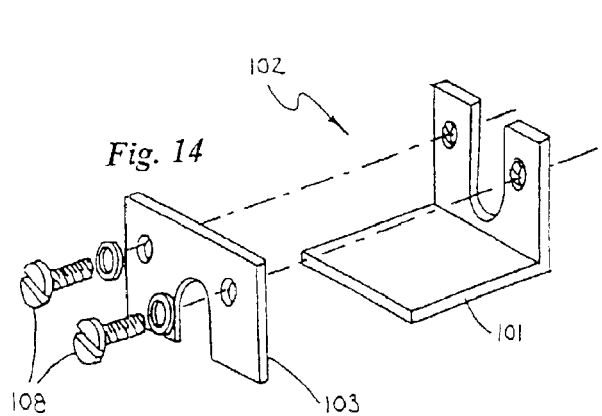
FIG. 14 is an exploded view of a bearing bracket assembly with associated fasteners.
Figure 15:
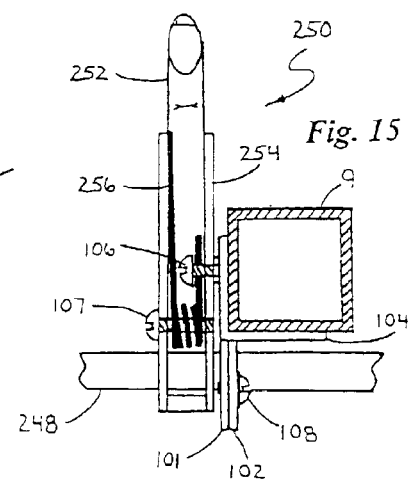
FIG. 15 depicts a front cross-sectional view of the foot lever assembly and associated mounting hardware.

FIG. 13 through FIG. 15 illustrate the various brackets utilized for mounting foot trigger assembly 250 to foot trigger assembly support rails 9 as shown in FIG. 3. FIG. 13 depicts the coil spring tension bracket 104 and arm holding screw and nut 106. Note that an arm of coil spring 256 is retained against screw 106, as illustrated in FIG. 12. FIG. 14 is an exploded view (illustrated upside down) of bracket bearing assembly 102 which includes lower bearing bracket 101, bearing bracket collar 103, and bearing bracket assembly screws and washers 108. FIG. 15 illustrates a cross sectional view of foot trigger assembly support rails 9, with bracket bearing assembly 102, coil spring tension bracket 104, foot lever 252, foot lever cradle bracket 254, and tension coil spring 256 assembled together.

It should be noted that the embodiments of hand trigger assemblies 55, 57 illustrated in FIG. 8 through FIG. 10, and the embodiment of foot trigger assembly 250 illustrated in FIG. 11 through FIG. 15 are exemplary mechanisms utilized to secure the contact blade assemblies 36, 269 within their respect receiving tubes 41, 43, 234, 236. Nevertheless, any other suitable or equivalent securing device may be utilized to perform the same function.

FIG. 16, and FIG. 10 illustrate the installation of the contact blade assemblies 36, 269 into the main tubular structure 16, 213 of the seat climber 15 and foot climber 212. Herein described below is the manner in which cord 7 is drawn through cord receiving slot 32, 268, and attached into keyhole 20. Initially, elastic cords 7 and end caps 40 are installed into contact blade assemblies 36, 269 as shown in FIG. 4 and FIG. 7. Next, the contact blade assemblies 36, 269 are slid into the corresponding telescoping arm receiving tubes 41, 43, 234, 236 of seat climber 15 and foot climber 212. As the contact blade telescoping arms 38, 271 are inserted into receiving tubes 41, 43, 234, 236, the terminated end of cords 7, including crimp wire 5 and retaining washers 6, are pulled through key hole 20. Key hole 20 is located on the upper surface of receiving tubes 41, 43, 234, 236, as shown in FIG. 10, FIG. 16 and FIG. 17. Next, the terminated end of elastic cord 7 is pulled through the key hole 20 and inserted into the narrow neck portion of key hole 20. As a result, the terminated end of elastic cord 7 and the elastic cord retaining washer 6 is held by key hole 20 so that elastic cord 7 is now attached to receiving tubes 41, 43, 234, 236, as shown in FIG. 10 and FIG. 16.

FIG. 16 shows a partial side cross-sectional view of contact blade telescoping arms 38, 271 installed within receiving tubes 41, 43, 234, 236 of seat climber 15 and foot climber 212. From FIG. 16, it is evident that once tension cord 7 is fastened to key hole 20, and the contact blade assembly 36, 269 is inserted into the receiving tubes 41, 43, 234, and 236, then cord 7 will be stretched into a state of higher tension. As a result, contact blade assembly 36, 269 will be biased in a direction out of receiving tubes 41, 43, 234, and 236, unless latching hooks 55, 57, 250 are in an latched and engaged state. The arrow in FIG. 16 graphically illustrates the direction in which the contact blades 37, 270 travel due to the tension in the stretched cord 7.

FIG. 18 provides a cross-sectional view of gripping blade telescoping arms 25, 215 inserted into receiving tubes 21, 23, 222, 224 with security pin 61, 280 installed through pin receiving holes 14 and telescoping arm receiving holes 17, 216. Before ascending tree or pole 4, the gripping blade assemblies 24 should be removed from seat climber 15 and foot climber 212. By removing security pins 61 (see FIG. 2 and FIG. 18) from gripping blade receiving tubes 21, 23, gripping blade assembly 24 can be withdrawn from seat climber 15. Similarly, by removing security pins 280 (see FIG. 3 and FIG. 18) from gripping blade receiving tubes 222, 224, gripping blade assembly can be withdrawn from foot climber 212.

FIGS. 19(a)–(c) are included to assist in the description of how the two platform tree stand 10 is mounted onto a tree or pole 4, and furthermore, to assist in describing how the adjustable leveling feature of the present invention is operated by the user.

First the user should attach foot climber 212 to the trunk of the tree or pole 4. Before mounting the foot climber 212 to the tree, the user should verify that contact blade assembly 269 is fully inserted into contact blade telescoping arm receiving tubes 234, 236. This pre-installation procedure can be accomplished by pushing down on the foot lever 252 of the foot trigger assembly 250 to disengage the foot trigger latching hooks 249 from latch receiving hole 251 and contact blade leveling adjustment holes 288, fully sliding the contact blade assembly 269 into the receiving tubes 234, 236, and then releasing foot lever 252 such that latching hooks 249 re-engage the latch receiving hole 251 and leveling holes 288. Elastic cord 7 will be stretched so that a preloaded tensile force exists between the elastic cord 7 and contact blade assembly 269. At this point in the installation procedure, the contact blade assembly should be left fully inserted into receiving tubes 234, 236 with the full preload. As illustrated in FIG. 16 by the arrow underneath contact blade 270, a force vector will result from the preload, and when foot trigger assembly 250 is disengaged, contact blade 270 will be telescopically forced out from the preloaded tension in the elastic cord 7. However, in this situation, foot trigger assembly 250 should not be disengaged until a leveling adjustment is required, which occurs later on in the installation process.

Next, the user should lift foot climber 212 up and position adjacent to the tree such that the contact blade 270 is squarely engaged to the surface of the tree trunk as shown in FIG. 19(a). The user should re-install gripping blade assembly 24 back into the foot climber 212 so that the tree or pole 4 is now clasped or clamped between gripping blade 214 and contact blade 270 as illustrated in FIG. 19(a). At this point, the foot climber 212 platform is held approximately parallel to the ground while the user re-installs the two security pins 280 into each security pin hole 14 and through the gripping blade telescoping arm pin receiving holes 216 illustrated in FIG. 18. The foot climber 212 is now secured to the tree or pole 4 and can be released from the user's hands.

In a similar manner, the user should now mount seat climber 15 to the trunk of the tree or pole 4, above foot climber 212 as shown in FIG. 19(a). As previously described, the user should verify that the contact blade assembly 36 is fully inserted into the seat climber contact blade receiving tubes 41, 43 before mounting the seat climber 15 to the tree 4 such that a preload exists. In this case the user should simultaneously depress both hand triggers 55, 57 to disengage latching hooks 31 from latch receiving holes 45 and contact blade leveling adjustment holes 89. The contact blade assembly 36 should then be fully slid into receiving tubes 41, 43, and hand triggers 55, 57 should be released such that latching hooks 31 re-engage the latch receiving holes 45 and the appropriate leveling adjustment holes 89. At this point, elastic cord 7 will be stretched so that a preload exists between the elastic cord 7 and contact blade assembly 36. As illustrated in FIG. 16 by the arrow underneath contact blade 37, a force vector will result from the preload, and when the hand trigger assemblies 55, 57 are simultaneously disengaged, contact blade 37 will be telescopically forced out from the preloaded tension in the elastic cord 7. However, at this point in the installation procedure, the contact blade assembly 36 should be left fully inserted into receiving tubes 41, 43 with the full preload until the leveling adjustment is required.

The seat climber 15 can now be installed just above foot climber 212 following the same installation procedure used for the foot climber 212. The user should lift seat climber 15 up and position it above foot climber 212 and adjacent to the tree such that contact blade 37 is squarely engaged to the surface of the tree trunk. The user should re-install gripping blade assembly 24 back into seat climber 15 so that the tree or pole 4 is clasped or clamped between the gripping blade 13 and contact blade 37 as shown in FIG. 19(a). At this point, the seat climber 15 platform is held parallel to the ground while the user re-installs the two security pins 61 into each security pin hole 14 and through the gripping blade telescoping arm pin receiving holes 17 illustrated in FIG. 16. The seat climber 15 is now secured to the tree 4 and can be released from the user's hands. Now the tree stand 10 is installed to the tree 4 as illustrated in FIG. 19(a).

Next, the user, while facing the tree 4, climbs onto seat climber 15 and steps into the interior region 47 (see FIG. 2) of seat climber 15, positioning the user's feet onto footing grates 148 of the foot climber 212. The user can now sit on seat 75 of seat climber 15. To raise seat climber 15 up the tree from the initial in mounted position illustrated in FIG. 19(a), the user should stand upright in the seat climber 15 in the interior region 47 and position the user's feet securely on the top surface of the foot climber 212 footing grates 148. The user should then grip both right and left gripping blade receiving tubes 21, 23 of seat climber 15. With a wrist pivoting motion, the user should lift the back of seat climber 15 upward (i.e., outboard towards seat 75), which will release gripping member 13 from the tree trunk 4. Next, the seat climber 15 is lifted to the user's waist height, and with a counter wrist pivoting motion, the user then lowers the back of the seat climber 15 back down which will allow the gripping member 13 and the contact blade 37 to engage the tree trunk 4. The seat climber 15 is now secure at its new elevated position.

Next, the user should lift the foot climber 212 using his or her feet. The user accomplishes this by sitting on seat 75 of climber 15. With one hand, the user reaches downward to lift foot strap 11 from foot climber 212, so that the user's feet can be placed directly underneath foot strap 11 to form a loosely secured loop above the top of the user's feet. This will allow the user to pull the foot climber 212 upward by using his or her feet, while the user is simultaneously sitting atop seat climber 15. With an ankle pivoting motion, the user lifts the back (i.e., outboard towards frame cross member 264) of the foot climber 212 upward as shown in FIG. 19(a). The lifting motion will release gripping member 214 from the tree trunk or pole 4. Next, the user should lift his feet, upwardly pulling the foot climber 212 until it reaches a height just below the seat climber 15. With a counter ankle pivoting motion the user should then lower the back of the foot climber 212, which will allow gripping member 214 and the contact blade 270 to re-engage the tree trunk 4. The foot climber 212 is now secure at its new elevated position.

The aforementioned climbing process should be repeated until the user reaches his desired height. However, as the seat climber 15 and foot climber 212 are cinched up the tree 4, they can become unlevel as shown in FIG. 19(b). To address this problem, the angle of inclination of the main tubular structure 16 of the seat climber can be adjusted. This is accomplished by utilizing the tree stand's 10 adjustable leveling features. When the user is ready to make a leveling adjustment to seat climber 15, the user should grab both right and left contact blade receiving tubes 41, 43 just above hand triggers 55, 57, and extend his or her index finger over the beveled trigger handle 33 to disengage trigger latching hooks 31. By simultaneously depressing the trigger handles 33, the trigger latching hooks 31 will retract from the latch receiving holes 45 and contact blade leveling holes 89 and in which hooks 31 are engaged. While holding both triggers 55, 57 open, the user can adjust the angular inclination of the main tubular structure of seat climber 15, (with assistance from the preloaded tension from elastic cord 7) by lifting upward or pushing downward the main frame of seat climber 15 until the user finds his or her's new comfort level. In this case, the preload from elastic cords 7 and engaging force of contact blade 37 to the surface of the tree, will assist the user in raising or lowering the main tubular structure's angle of inclination. In particular, the pretension from the elastic cords 7 forces out the contact blade 37 (illustrated by arrows in FIG. 19(c), or the force from the contact blade assembly 36 engaging the tree and the weight of the tree stand and user can be used in assisting the retraction of the contact blade assembly 36 while maintaining significant gripping/engagement contact against tree trunk or pole 4. Upon completion of the leveling adjustment, the user can release triggers 55, 57 which will, in turn, re-engage trigger latching hooks 31 upward into a new leveling adjustment hole 89. Now the seat climber should be level with the ground as illustrated in FIG. 19(c).

The user at this time should also adjust the angular inclination of the main tubular structure 213 of the foot climber 212 by reaching his right foot forward until his or her toe makes contact with the foot lever 252. With a forward toe pushing motion, the foot lever 252 will pivot downward, retracting the foot trigger latching hooks 249 from the currently engaged latch receiving holes 251 and leveling holes 288. While the user pushes down foot lever 252 with his foot, the preloaded elastic cords 7 of the contact blade 270 will assist in raising or lowering the main tubular structure 213 of foot climber 212 when the user applies more or less leg pressure to his feet. In a similar manner to the seat climber 15, contact blade 270 will provide a sufficient force against the tree trunk, while simultaneously allowing for the contact blade assembly 269 to be forced out or retracted in until a level position is acquired. When a new comfort level is achieved with respect to the main tubular structure's angle of inclination, the user can release foot lever 252, which will then re-engage the foot trigger latching hooks 249 upward into receiving holes 251 and appropriate leveling holes 288.

The process described above should be repeated until the user has climbed the tree or pole 4 to the desired height. Since the seat climber 15 and foot climber 212 main frame will likely become unlevel while ascending or descending a tree 4, the leveling process can be implemented any time during the climbing or descending process.

After the user completes his hunt, the same climbing procedure is reversed for descending the tree to ground level. When descending tree 4, the user should first verify that the removable seat 75 is secured with mounting tethers 18 to the back of the seat climber 15 platform. This can be accomplished by positioning seat 75 on top of the contact blade receiving tubes 41, 43 and outer frame cross member 39. Next, while in a sitting position, the user should install both feet into foot strap 11. With an ankle pivoting motion, the user should lift the back of the foot climber 212 upward. As a result, the gripping member 214 will disengage from the tree trunk 4. The user can now lower the foot climber 212 until the legs are fully extended. At this time with an ankle pivoting motion, the user should lower the back of the foot climber 212 until the gripping blade 214 and contact blade 270 re-engage the tree trunk 4.

With the foot climber 212 now at its secured lowered position, the user should grip both right and left contact blade receiving tubes 41, 43 just above the hand triggers 55, 57 and with a wrist pivoting motion, lift the back of the seat climber 15. This will disengage the gripping blade 13 from the tree trunk 4. At this point, the user can now lower the seat climber 15 to approximate knee height, and pivot the back of the seat climber 15 downward until the gripping blade 13 and contact blade 37 re-engage tree trunk 4. The user should repeat this procedure until reaching ground level.

During the descent, he user will notice an increase of the angle of inclination with respect to the main body 16, 213 of the seat climber 15 and foot climber 212 due to the increase of tree diameter during the descending process. At any time the user can activate the hand trigger 55, 57 and foot trigger 250 mechanisms to initiate a leveling adjustment procedure. By the time the user has made the last leveling adjustment at the base of the tree trunk 4, the contact blades 37, 270 will have been fully re-installed into the contact blade receiving tubes 41, 43, 234, 236. Simultaneously, the contact blades 37, 270 will be pre-loaded for next use. The user can now remove himself/herself from the body of the treestand 10 and disengage seat climber 15 and foot climber 212 from tree trunk 4.

FIG. 20 shows an illustration of a second embodiment of the adjustable leveling feature which includes alternative spring biasing device 300. Spring biasing device 300 would take the place of the elastic cord 7. The spring biasing device 300 is housed within the contact blade telescoping arm receiving tubes 41, 43, 234, 236 such that it is preloaded against the inserted distal ends of the contact blade telescoping arms 38, 271 and the back end of receiving tubes 41, 43, 234, 236. A difference between the elastic cord 7 application and the spring tension device 300 is that the contact blade telescoping arms 38, 271 are shortened to accommodate the spring compression, key hole 20 is no longer required, and cord receiving slots 32, 268 of the contact blades telescoping arms 38, 271 are also no longer required, as shown in FIG. 20. All other components of tree stand 10 remain the same.

FIGS. 21 (a)–(d) illustrate a variety of alternative embodiments for the shape of the contact blades 37, 270. FIG. 21(a) features a U-shaped or channel shaped contact blade 302. FIG. 21(b) depicts a three-sided contact blade 304. FIG. 21(c) shows a five-sided contact blade 306. FIG. 21(d) shows a semi-circular shaped contact blade 308. Depending on the diameter, surface roughness, and shape of the tree, pole, column, or like, the user may select a contact blade 37, 270 which best engages the tree, pole, column, or like 4.

The materials utilized in manufacturing the two platform tree stand 10 are preferably lightweight and high strength metal alloys, such as aluminum or titanium. For example, a metal alloy such as a 6061 series high tensile strength aluminum, with a 0.065" wall thickness. To assure strength, the assembly of treestand 10 should be welded construction at all intersecting joints where motion is not required.

In the embodiments disclosed above, the tree stand 10 utilizes 1.00"×1.00" square tubing for the main tubular structure 16, 213 and receiving tubes 41, 43, 234, 236 for each respective platform. The male counter parts of the gripping blade telescoping arms 25, 215 and contact blade telescoping arms 38, 271 utilize 0.75"×0.75" square tubing. The gripping blades 13, 214 are constructed of ¼" thick aluminum sheet metal. The hand and foot trigger latching hooks 31, 249 utilize ⅜" solid rod stock (steel, aluminum, or high strength alloy). Nevertheless, the above noted materials and dimensions are merely exemplary and any other suitable materials having different dimensions, yet having equal or higher strength may be substituted instead.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF PARTS AND REFERENCE NUMBERS

2. Elevation supports
3. Elevation supports
4. Tree, pole, column or the like
5. Elastic cord crimp wire
6. Elastic cord retaining washer
7. Elastic cord
9. Foot trigger assembly support rails
10. Two platform climbing tree stand
11. Foot strap
13. Upper gripping blade
14. Security pin receiving hole
15. Seat climber
16. Main tubular structure
17. Gripping blade telescoping arm pin receiving holes
18. Mounting tethers
20. Key hole
21. Seat climber gripping blade right side receiving tube
23. Seat climber gripping blade left side receiving tube
24. Gripping blade assembly
25. Gripping blade telescoping arms
30. Metal rod
31. Hand trigger latching hooks
32. Cord receiving slot
33. Beveled finger grip
35. Inner frame cross member
36. Upper contact blade assembly
37. Upper contact blade
38. Contact blade telescoping arms
39. Outer frame cross member
40. Retaining cap
41. Right side contact blade telescoping arm receiving tube
43. Left side contact blade telescoping arm receiving tube
45. Latch receiving hole
47. Interior region
51. Hand trigger pivoting screw and nut
53. Hand trigger mounting bracket
55. Hand trigger assembly
56. Trigger latch cradle bracket
57. Hand trigger assembly
59. Tension coil spring
61. Security pin
75. Removable seat
89. Contact blade leveling adjustment holes
100. Bearing collar
101. Lower bearing bracket
102 Actuation linkage bearing bracket assembly
103. Bearing bracket collar
104. Coil spring tension bracket
106. Coil spring arm holding screw and nut
107. Coil spring retaining screw
108. Bearing bracket assembly screws and washers
148. Footing grates
212. Foot climber
213 Main tubular structure
214. Lower gripping blade
215 Gripping blade telescoping arms
216. Gripping blade telescoping arm pin receiving holes
222. Foot climber gripping blade right side receiving tube
224. Foot climber gripping blade left side receiving tube
234. Left side contact blade telescoping arm receiving tube
236. Right side contact blade telescoping arm receiving tube
248. Foot trigger actuation linkage
249 Foot trigger latching hooks
250. Foot trigger assembly
251. Latch receiving hole
252. Foot lever
254. Foot lever cradle bracket
256. Tension coil spring
262. Inner frame cross member
264. Outer frame cross member
265. Interconnection member
268. Cord receiving slot
269. Lower contact blade assembly
270. Lower contact blade
271. Contact blade telescoping arms
280. Security pin
288. Contact blade leveling adjustment holes
300. Alternative spring biasing device
302. U-shaped contact blade
304. Three-sided contact blade
306. Five-sided contact blade
308. Semi-circular contact blade

What is claimed:

1. A tree stand comprising:
a main tubular structure for supporting the user;
a contact blade assembly comprising a contact blade slidably coupled to said main tubular structure, a pair of adjustable contact blade telescoping arms for telescopically connecting said contact blade to said main tubular structure and cord receiving slots extending along an upper surface of said contact blade telescoping arms;
said contact blade assembly further comprising elastic cords within said contact blade telescoping arms, one end of each of said elastic cords secured to distal ends of said contact blade telescoping arms, said distal ends being directly inserted into said contact blade telescoping arm receiving tubes, and an opposing end of said elastic cords being rauted upward through said cord receiving slots and attached to an upper surface of said contact blade telescoping arm receiving tubes via a key hole;
a gripping blade assembly comprising a gripping blade slidably coupled to said main tubular structure;
said gripping blade assembly and said contact blade assembly being arranged to clamp the tree between said gripping blade and said contact blade, for engaging and abutting the tree stand against the surface of the tree; and
an adjusting device coupled to said contact blade assembly arranged to adjust an angular inclination of said main tubular structure.

2. The tree stand according to claim 1, said gripping blade assembly telescopically connected to said main tubular structure via a pair of adjustable gripping blade telescoping arms.

3. The tree stand according to claim 1, said main tubular structure comprising a pair of contact blade telescoping arm receiving tubes for telescopically accepting said contact blade telescoping arms.

4. The tree stand according to claim 1, said contact blade assembly further comprising leveling adjustment holes on a bottom surface of said contact blade telescoping arms structured for releasably coupling with said adjusting device.

5. The tree stand according to claim 4, said adjusting device comprising at least one latching mechanism to releasably engage said leveling adjustment holes for securing said contact blade telescoping arms from movement within said contact blade telescoping arm receiving tubes.

6. The tree stand according to claim 1, wherein said pair of adjustable contact blade telescoping arms are rigidly interconnected by said contact blade.

7. The tree stand according to claim 1, said contact blade conforming to a shape being one of obtuse angled, u-shaped, channel-shaped, three-sided, five-sided, and semi-circular-shaped.

8. The tree stand according to claim 5, said at least one latching mechanism comprising a latching hook structured to be removably insertable into said leveling adjustment holes.

9. A tree stand comprising two separate platforms, each platform comprising:
　a main tubular structure for supporting the user;
　a gripping blade assembly for clamping the tree between a gripping blade and a contact blade, said gripping blade assembly telescopically connected to said main tubular structure via a pair of adjustable gripping blade telescoping, arms;
　a contact blade assembly for engaging and abutting against an inside surface of the tree, and for adjusting an angular inclination of the main tubular structure, said contact blade telescopically connected to said main tubular structure via a pair of adjustable contact blade telescoping arms; and
　a cord receiving slot extending along an upper surface said contact blade telescoping arms;
　said contact blade assembly further comprising elastic cords within said contact blade telescoping arms, one end of each of said elastic cords secured to distal ends of said contact blade telescoping arms, said distal ends being directly inserted into said contact blade telescoping arm receiving tubes, and an opposing end of said elastic cords being routed upward through said cord receiving slots and attached to an upper surface of said contact blade telescoping arm receiving tubes via a key hole.

10. The tree stand according to claim 9, said main tubular structure comprising a pair of contact blade telescoping arm receiving tubes for telescopically accepting said contact blade telescoping arms.

11. The tree stand according to claim 9, said contact blade assembly further comprising leveling adjustment holes on a bottom surface of said contact blade telescoping arms for receiving a latching hook.

12. The tree stand according to claim 11, each platform further comprising at least one latching mechanism which engages said leveling adjustment holes for securing said contact blade telescoping arms from movement within said contact blade telescoping arm receiving tubes.

13. The tree stand according to claim 9, said pair of adjustable contact blade telescoping arms rigidly interconnected by said contact blade.

14. The tree stand according to claim 9, said contact blade conforming to a shape being one of obtuse angled, u-shaped, channel-shaped, three-sided, five-sided, and semi-circular-shaped.

15. A two platform tree climbing stand comprising:
　a seat climber having an inboard and outboard side, said inboard side being structured and arranged to engage the tree, the seat climber comprising:
　　a first main tubular structure for supporting the user,
　　a first gripping blade assembly telescopically connected to an upper portion of said inboard side of said first main tubular structure, and
　a first contact blade assembly telescopically connected to a lower portion of said inboard side of said first main tubular structure; and
　a foot climber having an inboard and outboard side, said inboard side being structured and arranged to engage the tree, the foot climber comprising:
　　a second main tubular structure for supporting the user,
　　a second gripping blade assembly telescopically connected to an upper portion of said inboard side of said second main tubular structure, and
　a second contact blade assembly telescopically connected to a lower portion of said inboard side of said second main tubular structure;
　said first and second contact blade assemblies comprise a contact blade rigidly connecting a pair of contact blade telescoping arms oriented in a parallel configuration and cord receiving slots extending along an upper side of said contact blade telescoping arms:
　said first and second main tubular structures comprising a pair of receiving tubes for receiving said pair of contact blade telescoping arms;
　said first and second contact blade assemblies containing a biasing system for forcing said contact blade against the surface of the tree;
　said biasing system comprising resilient cords secured to distal ends of said contact blade telescoping arms, said cords being internally routed within said contact blade telescoping arms and routed externally through said cord receiving slots, a free end of said cords being secured to each respective receiving tube via a key hole slot.

16. The tree climbing stand according to claim 15, further comprising latching assemblies having hook-shaped latches secured to said contact receiving tubes for securing said first and second pair of adjustable contact blade telescoping arms in position, the telescoping arms having a series of pairs of receiving holes and the receiving tubes having a latch receiving hole for securely receiving said hook-shaped latches.

* * * * *